June 19, 1962 M. CAMRAS 3,040,124

TRANSDUCER HEAD SYSTEM

Filed June 25, 1956 3 Sheets-Sheet 1

Inventor
Marvin Camras by Hill, Sherman, Meroni, Gross + Simpson Attys

TRANSDUCER HEAD SYSTEM

Filed June 25, 1956 3 Sheets-Sheet 2

Inventor
Marvin Camras by Hill, Sherman, Meroni, Gross & Simpson Att'ys

TRANSDUCER HEAD SYSTEM

Filed June 25, 1956 3 Sheets-Sheet 3

Inventor
Marvin Camras by Hill, Sherman, Meroni, Gross & Simpson Attys 3,040,124
Patented June 19, 1962

3,040,124

TRANSDUCER HEAD SYSTEM

Marvin Camras, Glencoe, Ill., assignor to Armour Research Foundation of Illinois Institute of Technology, Chicago, Ill., a corporation of Illinois Filed June 25, 1956, Ser. No. 593,542
17 Claims. (Cl. 178—6.6)

This invention relates to a novel recording system and method, to novel playback devices and methods, and to a novel record produced by the recording system and method.

It is an important object of the present invention to provide a novel recording system and method.

It is a further object of the present invention to provide a novel playback system and method.

A further object of the present invention is to provide a novel record for use in electrostatic playback systems.

Another object is the provision of a recording system wherein the recordings may be erased from the record media, and the record media reused, if desired.

A more specific object of the present invention is to provide a novel system and method for recording and reproducing video signals. Another more specific object of the present invention is to provide a novel recording head and a novel playback head.

In its broad aspect, the present invention relates to the recording and playback either electrostatically or by other means of internal field patterns within a record medium. Electrostatic video recording is advantageous since very small currents during recording are sufficient for full recording, and will result in a readily reproduced signal, and since the same tube may be used both for recording and playback.

Other objects, features and advantages of the present invention will be more fully apparent from the following detailed description taken in connection with the accompanying drawings, in which.

As shown on the drawings.

The present invention is particularly applicable to the recording of video signals, such as television signals, on a lengthy record medium. In television, at the present time, the moving scene to be transmitted is translated into electrical impulses by means of a process of scanning wherein the image to be transmitted is scanned in periodically repeated paths covering the image area. A television signal is thus generated which indicates the brightness of successive points along the scanning path. This signal is transmitted over communications channels and controls a scanning electron beam at the reproducer to reproduce the image on a viewing screen. At the reproducer, the image is commonly produced as a series of straight parallel lines making up what will be termed a frame. The reproduced image is commonly projected at the rate of 60 interlaced frames, or 30 complete frames per second to give the image the illusion of continuous motion. An audio signal commonly accompanies the television signal.

Figures 1, 2, 3, 4, 5, 6:
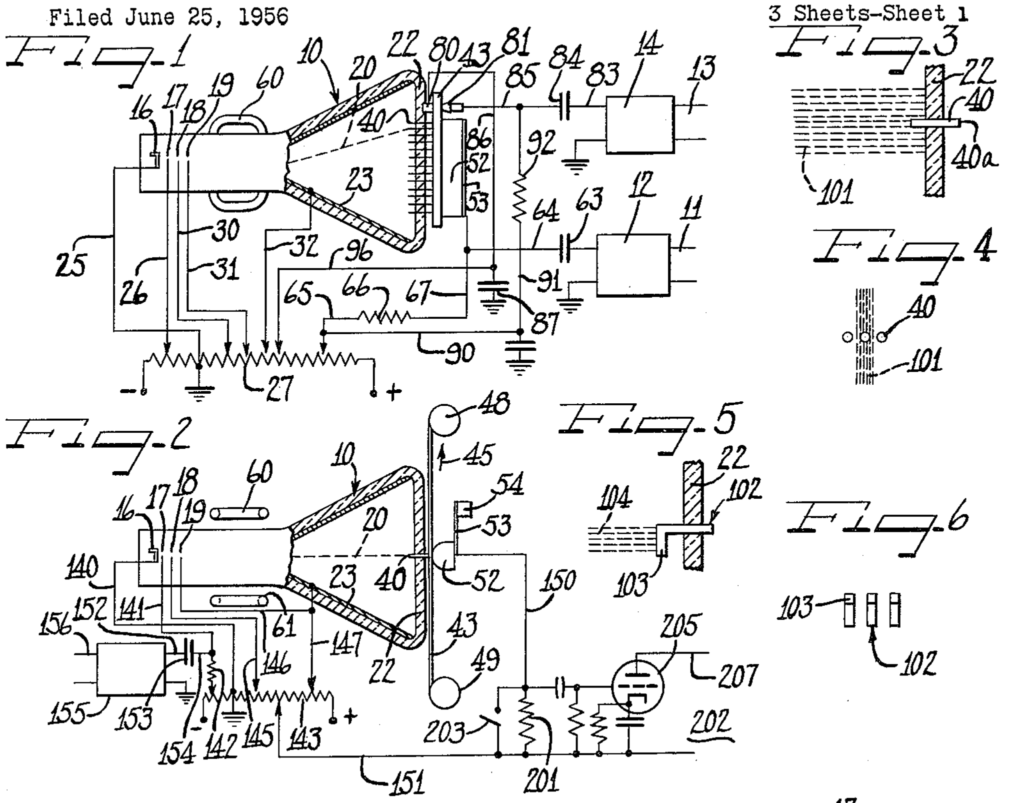
FIGURE 1 is a diagrammatic view of a recording system in accordance with the present invention.
FIGURE 2 is a diagrammatic view of a modified system for recording.
FIGURES 3 and 4 illustrate diagrammatically a modified electron beam for use in the heads of FIGS. 1 and 2.
FIGURES 5 and 6 illustrate a modified electrode structureand beam for use in the heads of FIGS. 1 and 2.

In FIGURE 1 is represented a video recording tube 10 adapted to record video signals received from input lines 11 and suitably amplified and equalized at 12. The recorder 10 may also receive the accompanying audio signal at the input 13 of audio amplifier and equalizer means 14. The tube 10 may contain conventional electron gun elements including a cathode 16, a control grid 17 and accelerating and focusing anodes 18 and 19 for projecting an electron beam indicated diagrammatically at 20 toward and end wall 22 of the tube. The interior wall of the tube 10 may have a conductive coating 23 thereon as indicated in FIGURE 1 which may be supplied with suitable potential for further controlling and accelerating the electron beam 20. The cathode 16 which may be heated by suitable means to cause the emission of electrons is illustrated as being grounded by means of a conductor 25, and a suitable negative bias voltage is illustrated as being applied to the control grid 17 by means of a conductor 26 connected by a slidable tap to power supply resistor 27. Anodes 18 and 19 are illustrated as receiving suitable voltages from the power supply resistor 27 by means of conductors 30 and 31 which also connect with suitable sliding taps on the resistor 27 in the diagrammatic illustration. The conductive coating 23 is illustrated as receiving a somewhat higher potential by means of the conductor 32. Although FIGURES 1 and 2 show the cathode at ground potential, we could just as well have chosen the backing electrode 52, the second anode 23, or any other point as "ground," in which case the cathode would be at high negative potential with respect to ground.

The end wall 22 of the tube, which may be made of glass or other non-conductive insulating material, carries a series of fine electrically conductive wires 40 which extend through the wall 22 and at the interior of the tube are disposed along the path of deflection of the electron beam 22. External to the tube, the wires extend in proximity to a record medium 43 which is of a nature to retain an electrical charge impression. The record medium 43 may be suitably moved relative to the wires 40 in a direction generally at right angles to the row of wires 40 as indicated by the arrow 45 in FIGURE 2. The medium is to have electric fields recorded therein in accordance with the teachings of the present invention. In this case, as seen in FIGURE 3, the wires 40 terminate at the exterior of the tube in ends 40*a*. As illustrated in FIGURES 1 and 2, the record medium 43 is pressed against the ends 40*a* of the wires by means of a resilient pad 52 which is suitably impregnated with a conductive material. As illustrated in FIGURE 2, the pad 52 may be carried on a spring arm 53 secured to a fixed support 54 in such a manner that the spring arm 53 resiliently urges the pad 52 against the record medium 43. By way of example, the pad 52 may be of felt impregnated with a conductive material such as graphite or may be a resilient metal fiber pad. The pad 52 is adjusted to have its center line exactly opposite or in line with the axes of the wires 40.

In FIGURES 1 and 2, the beam 20 is illustrated as being deflected by suitable magnetic coils 60 and 61 which serve to deflect the beam 20 along the series of wires 40 in synchronization with the line frequency of the video input signal. In the circuit of FIGURE 1, the video signal is supplied through a coupling capacitor 63 and conductor 64 to the conductive pad or backing electrodes 52 where it is superimposed on a high potential from the power supply resistor 27 which is connected to the backing electrode 52 by means of a conductor 65, resistor 66 and conductor 67. The beam 20 may be thought of as a switch mechanism which successively connects the wires 40 to the cathode through the internal resistance of the cathode ray tube. A wire thus connected maintains a definite potential with respect to the backing plate, of magnitude which is adjusted to give optimum recording on the medium which passes between the wire and the backing plate. The other wires "float" until they in turn are connected to the beam. The backing electrode 52 may be at either a higher or lower D.C. potential than the potential applied to the coating 23.

It has been found that when a sufficiently high potential is impressed upon a dielectric medium in the manner illustrated in FIGURE 1, charges or electric fields are created within the medium which may be electrically scanned on playback. The charge which is created in the tape is not a surface charge since it cannot be wiped off, and since it can be repeatedly played back by means of metal electrodes in contact with the tape. Fields which are recorded as illustrated in FIGURE 1 and which have the characteristic that they cannot be wiped off but can be repeatedly played back will be termed herein "internal fields." Charges which are produced on a dielectric record medium by the present invention and which cannot be wiped off by grounded metal electrodes in contact with the record medium will be termed herein "internal charges." Recording in accordance with the present invention is also to be distinguished from "electret" recording which requires certain specialized materials to be heated while being subjected to an electric field, and thereafter rapidly cooled. Recording in accordance with the present invention is further to be distinguished from recording on piezoelectric or ferroelectric materials wherein the polarization of the medium can only be sensed by specially stressing the record material. In the present invention, no particular type of dielectric material is required such as those required in electret or ferroelectric recording. By way of example, synthetic resin films are considered to be satisfactory for recording in accordance with the present invention. Recording has been carried out with thin tapes or films of vinyl chloride-acetate copolymers known by the trade name "Vinylite," polystyrene, polyethylene, cellulose acetate and polethylene terephthalate, a polyester film known by the trade name "Mylar." Both a type A "Mylar" which is manufactured by E. I. DuPont de Nemours & Co., Inc. for its mechanical properties, for example as a carrier for magnetic coatings in magnetic record tape, and a type C "Mylar" which is manufactured by the same company to have a high dielectric strength and low loss for use in capacitors have been successfully utilized in the recording system of the present invention. Suitable tapes of "Mylar," for example may have a thickness of .00025 inch to .001 inch. Recordings may also be made on coatings or films of various materials, for example, vinyl resin, on a suitable base such as "Mylar" tape.

The spacing between adjacent wires 40 is preferably on the order of the diameter or transverse extent of the wires themselves, so that if the wires have a diameter of .005 inch and 200 wires are sealed into the wall 40 of the tube 10, then the tape should have a width greater than two inches, and might, for example, have a width of 2½ inches if a sound track is to be recorded on the tape with the video signal. Of course, the wires can be made considerably finer, and considerably larger numbers of wires can be utilized.

In FIGURE 1, an audio recording head is illustrated as being in lateral alignment with the recording electrodes 40 of the video head, and may suitably comprise a backing electrode 80 in contact with one surface of the tape 43 and a knife edge electrode 81 in contact with the opposite surface of the tape 43. A suitable audio voltage is applied to the electrodes 80 and 81 by means of the circuit including conductor 83, capacitor 84 and conductor 85, and conductor 86, and capacitor 87. A high positive potential is applied to the knife edge electrode 81 from power supply resistor 27 by means of conductor 90, conductor 91, resistor 92, and conductor 85, while the backing electrode 80 is connected to a point of lower potential on the power supply resistor 27 by means of conductors 86 and 96.

As with the bias voltage supplied between the wires 40 and the backing electrode 52 of the video recording head, the bias voltage plus audio applied between the backing electrode 80 and the knife edge electrode 81 is of a sufficiently high potential to record internal fields within the record medium 43. The electrodes 80 and 81 may suitably be of a conductive material such as metal. The use of relatively thin tapes of the order of .00025 inch, .0005 inch or .001 inch is preferred since at reasonable voltages such tapes can be stressed more successfully by high intensity electric fields without causing a breakdown or conduction of electric charge through the tape with the resultant puncturing of the tape. In recording, the D.C. biasing potential is adjusted to set up an electric field which nearly equals the breakdown potential of the tape when the A.C. signal to be recorded is superimposed thereon. Alternatively, high frequency bias may be employed instead of the D.C. bias illustrated in FIGURE 1. Perpendicular recording where the recording fields extend through the tape is preferred to longitudinal recording for recording internal electric fields on a dielectric record medium as illustrated in FIGURE 1. If desired, the wires 40 and knife edge electrode 81 may be embedded in a high dielectric strength material such as polystyrene, "Mylar," ceramics or epoxy resin with only the record-engaging ends of the electrodes exposed to limit or prevent corona formation at the edges of the electrode. By way of example of suitable bias voltages for recording on .00025 inch "Mylar" with the heads of FIGURE 1, a D.C. bias voltage of approximately 900 to 1000 volts across the tape is suitable, or an A.C. bias voltage of approximately 500 to 1000 volts R.M.S. has been found suitable. If the D.C. voltage across the tape is too low (less than about 400 volts for one of the examples tried) it is found that no recording takes place with a system such as illustrated in FIGURE 1. A tape having internal electric fields recorded in the manner illustrated in FIGURE 1 may be erased by means of a high frequency field or a saturating D.C. field.

To illustrate that the charges recorded by the system of the present invention are "internal" charges rather than surface charges, it has been found that holding a grounded electrode against the tape before it reaches the playback head, which will serve to remove the temporary surface charge on the tape such as may accumulate due to friction, actually improves playback by reducing background noise. This noise may be observed by moving the backing electrode out of contact with the tape. Such disengagement completely interrupts reproduction of the recorded signal, but noise is still present. Noise due to surface charge may also be reduced by means of a discharging electrode spaced from the tape with a high potential (relative to ground) applied to it. D.C. voltages of both polarities and high frequency A.C. voltage up to about 2000 volts may be used. A source of intense ultraviolet light in conjunction with the discharging electrode or the electrode in contact with the tape and at ground potential may be used so that the air surrounding the electrodes will ionize more easily and conduct charges from the electrode to the tape to neutralize the surface charge. Alternatively, photosensitive materials, for example sensitive to ultraviolet light, may be disposed near the record medium and energized to emit static-cancelling charges. Field emission (corona) may also be applied, as well as radioactive sources of ionization to assist in the neutralization of surface charge.

It has been found important to support the moving tape firmly near the pickup head to prevent mechanical vibration which will produce undesired vibration of surface charges on the tape and consequently introduce a noise signal at the pickup head. Electrostriction or piezoelectric effects are also to be avoided, since these effects will also introduce noise into the reproduced signal. Recording is preferably carried on at room temperature and the record medium is maintained in a substantially unstressed condition on playback to prevent piezoelectric effects where these might otherwise occur.

FIGURES 3 and 4 illustrate the modification of the embodiment of FIGURE 1 wherein the electron beam may have a general cross-section as illustrated in FIGURE 4 at 101, with the extent of the beam in the direction of deflection being such, for example, as to impinge only on one of the wires 40, but with a vertical extent many times the spacing between successive wires so as to impinge on the wires in spite of possible fluctuations in the positioning voltages which maintain the vertical position of the beam, these directions being for the case where the wires are disposed in a horizontal plane as illustrated in FIGURE 4.

Alternatively, as illustrated in FIGURES 5 and 6, wires 102 having downturned end portions as indicated at 103 may be substituted for the wires 40 and be used with a vertically elongated beam 104. As seen in FIGURE 6, the wires 102 may have a square cross-section.

In electric field recording of video signals in accordance with the present invention, it is desirable to create successive internal fields across the width of the record medium which tend to overlap or merge in the lateral direction particularly for relatively high intensity recorded signals so that scanning between successive points of the recorded signal across the width of the tape will still produce the desired playback signal. To accomplish this, it is preferable to space the wires 40 a distance approximately equal to their diameter or transverse extent or less so that the internal charges created by the successive wires 40 will produce internal fields which tend to merge into a relatively continuous field across the width of the tape as sensed by the playback head.

FIGURE 2 illustrates a head generally similar to the one shown in FIGURE 1. FIGURE 2 is taken in a plane such that only a single wire 40 appears, and the beam scans in the plane at right angles to the plane of the paper, while in FIGURE 1 the head is shown in such an orientation that the beam 20 scans in the plane of the paper. The same reference numerals have been applied to corresponding parts in FIGURES 1 and 2. In FIGURE 2, the cathode 16 is connected to ground by means of a conductor 140 and the control grid 17 is connected by means of a conductor 141 and a resistor 142 to a power supply resistor 143. Anode 18 is connected by means of a conductor 145 to the power source, and the second anode 19 is connected by means of conductors 146 and 147 to the conductive coating 23 and to the power source 143. The backing electrode 52 is maintained at a high potential by means of conductor 150, switch 203 and conductor 151 which has an adjustable contact with the power resistor 143. In this case the video signal produces a low level modulation and is introduced into the control grid circuit by means of conductor 152, capacitor 153 and conductor 154 from a suitable video amplifier 155 having an input at 156. Recording of the video signal takes place in the same manner as described in connection with FIGURE 1, and the same modifications illustrated in FIGURES 3 to 6 may be made in the embodiment of FIGURE 2. The head of FIGURE 2 may also be provided with an audio head as illustrated at 80—81 in FIGURE 1.

Figures 7, 8:
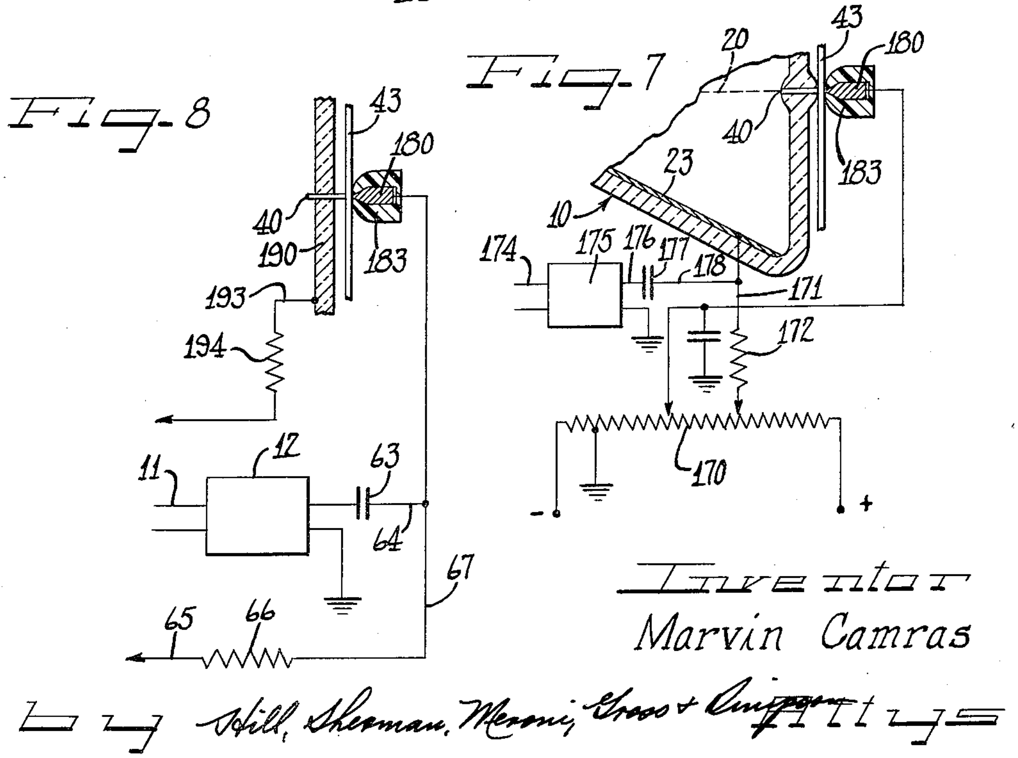
FIGURE 7 illustrates a further modified recording system.
FIGURE 8 illustrates another modified recording system.

In FIGURE 7, the parts are generally similar to those of FIGURES 1 and 2, and corresponding reference numerals have been applied to similar parts. In FIGURE 7, the same voltages are applied to the components of the electron gun as illustrated in FIGURE 1, but in FIGURE 7, the conductive coating 23 is connected to the power supply resistor 170 by means of a conductor 171 and resistor 172, and the signal voltage is applied to the conductive coating 23 from input 174 through amplifier and equalizer 175, conductor 176, capacitor 177 and conductor 178. In FIGURE 7, the backing electrode is illustrated as comprising a knife edge member 180 having its edge extending laterally across the tape for at least the width of the line of wires 40 in the same manner as the backing electrode 52 in FIGURE 1. Suitable means may be provided for pressing the knife edge against the tape, and preferably the knife edge is aligned with the axes of the wires 40 as illustrated in FIGURE 7. The knife edge electrode 180 may be embedded in a suitable insulating casing 183 to prevent corona formation at the edge. It will be appreciated that the knife edge electrode 180 may be used in the embodiments of FIGURES 1 and 2, or that the backing electrode 52 of FIGURES 1 and 2 may be used in place of the knife edge 180; it is preferred however, that at least one of the electrodes have a relatively sharp point or edge.

In the embodiment of FIGURE 8, the tube and electrode structure may be generally similar to that of FIGURE 1, and the backing electrode is similar to that illustrated in FIGURE 7, corresponding numbers designating similar parts. However, in FIGURE 8 the tube is provided with an end wall 190 which either itself is conductive or carries a conductive material of relatively high resistivity. The video signal is supplied from the amplifier 12 to the backing electrode in the same manner as in FIGURE 1, and the corresponding conductors and circuit elements have been given corresponding numerals. In FIGURE 8, however, a high resistance leakage path is provided for any charge which may accumulate on the wires 40 through the high resistance material of the wall 190 to conductor 193, resistor 194 and a suitable potential source (not shown). Ordinarily in arrangements such as FIGURES 1 and 2, the speed of the tape is sufficient to carry off charges that build up on the wires 40.

With respect to the embodiment of FIGURE 8, it may be noted that the wires 40 which are not energized by the electron beam assume approximately the same potential as the backing electrode 180 so that no recording takes place at these points along the tape. However, a wire which is being energized by the beam has a different potential than the recording backing electrode 180, and the difference in potential is adjusted so that proper bias for video recording will exist at the energized electrode.

By way of example in FIGURE 8, the insulating casing 183 may be an epoxy resin compound, and the ends of the wires 40 at the exterior of the wall 190 may also be embedded in the epoxy resin compound; or wires 40 may be surrounded by the glass envelope except at their ends as in FIGURE 7. It has been found that a head which previously gave about 1 volt output on playback gave a maximum output of about 4 volts under comparable circumstances on playback where the electrodes were completely embedded in the epoxy resin compound.

It is found that D.C. and A.C. bias produce comparable recordings at maximum signal levels, but that at lower signal levels, D.C. bias gives a smoother and less abrupt operating range. For video signals D.C. bias is simpler and is to be preferred.

In each of the preceding embodiments, it will be understood that the tape speed may be adjusted relative to the line frequency of the signal being recorded and the extent of the internal fields recorded by the head so that the internal fields of successive lines on the tape merge with or partially modify the longitudinally aligned fields of the preceding line to give a generally continuous electric field pattern in the longitudinal direction along the tape. If the conductors 40 are sufficiently closely spaced laterally of the tape, the internal fields produced thereby will likewise be closely contiguous and overlapping, so that if particles were dusted on the tape, the actual visual images of the video signal would appear as successive frames along the tape. By overlapping the fields in the lateral and longitudinal directions, scanning the recorded fields on the tape is greatly facilitated since the reproducing head does not have to be exactly aligned with the recording, and can even be tilted slightly without losing the signal as would happen with discrete spaced lines.

The nature of the overlapping electric fields recorded in accordance with the present invention can be visualized by considering each wire 40 as creating a circular charge area within the tape of intensity at the margin of the charge area as sensed by a pickup element centered at the margin which is a substantial portion of the intensity which would be sensed by a pickup element at the center of the circular charge area. If several lines of high intensity are recorded in succession on the tape, the circular charge areas may be touching at their margins with laterally and longitudinally adjacent charge areas or overlapping so that a proper playback intensity would be obtained even if the playback head scans between successive charge areas of each line and between successive lines of charge areas on the tape. Considering that the diameter of each charge area for a high intensity signal will approximate twice the diameter of the wires 40 for corresponding diameter pickup wires, it will be appreciated that this condition is approached where the separation between wires is approximately equal to the diameter or transverse extent of the wires, and the spacing between the centers of successive lines is approximately twice the longitudinal extent of the wires or less.

The sliding contacts making contact with the power supply resistors 27, 143 and 170 in FIGURES 1, 2 and 7 are illustrated purely diagrammatically and each slider or tap can be adjusted to any point on the entire divider independently of the position of adjacent taps to provide the desired voltages.

Figures 9, 10, 11, 12, 13, 14, 15, 16, 17:
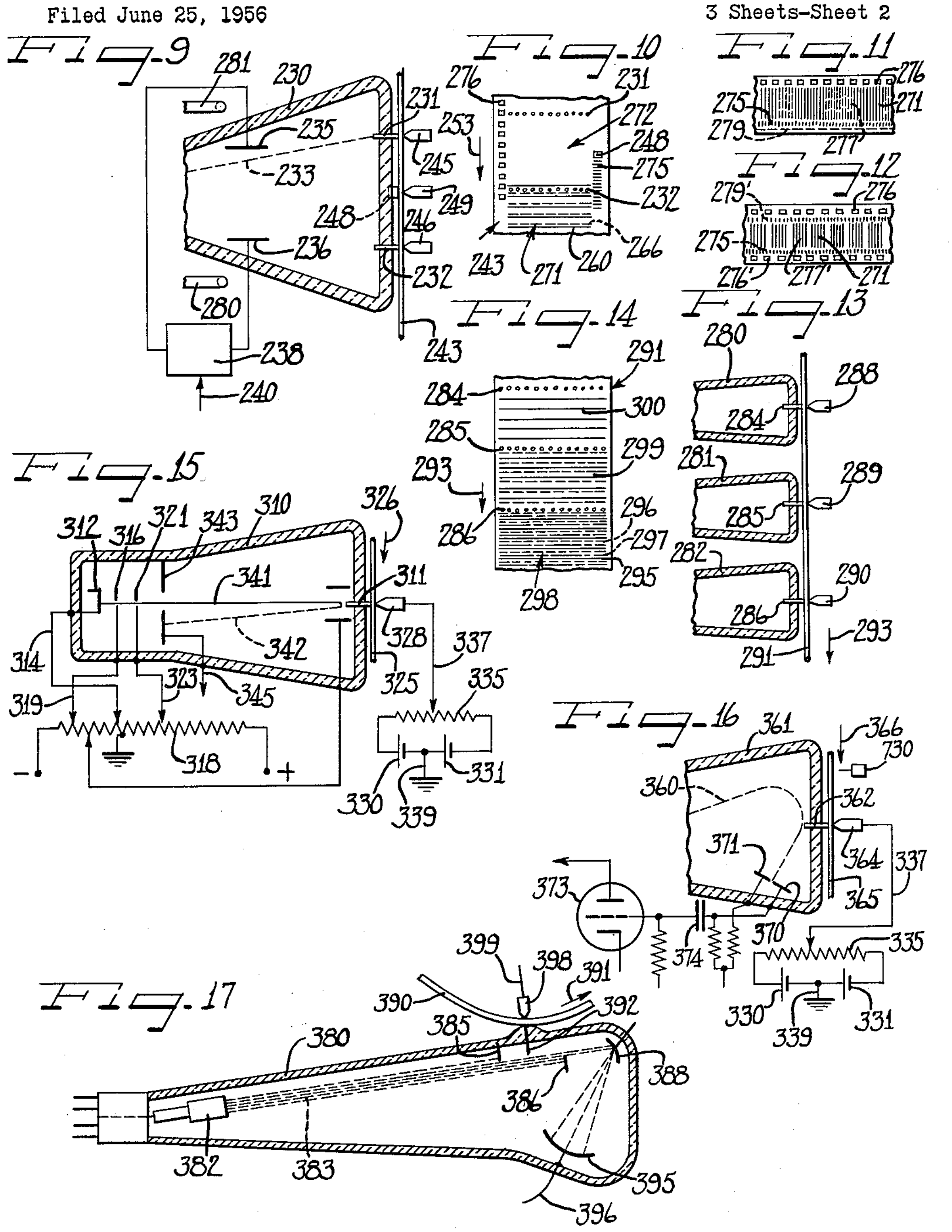
FIGURE 9 illustrates a system for recording interlaced frames of a video signal as composite or complete frames.
FIGURE 10 illustrates diagrammatically a record member produced by the system of FIGURE 9.
FIGURES 11 and 12 illustrate modified record members which may be produced in accordance with the present invention.
FIGURE 13 illustrates a further system for recording composite frames.
FIGURE 14 illustrates a record medium such as would be produced by the system of FIGURE 13.
FIGURE 15 illustrates diagrammatically a playback system in accordance with the present invention.
FIGURE 16 illustrates diagrammatically a modified playback system.
FIGURE 17 illustrates a further modified playback system.

In FIGURE 1, the audio head 80—81 can be used on playback also and in this case would be connected to the input 13 of the amplifier 14 whose output would then be connected to a suitable audio transducer such as a loudspeaker. The tubes of FIGURES 1, 2, 7 and 8 can be used for playback, for example by the addition of suitable control and collector electrodes such as illustrated in FIGURE 15 or 16. As illustrated in FIGURE 2, playback may be accomplished in FIGURES 1, 2, 7 and 8 without additional electrode structure by connecting a resistor 201 in series between the conductors 150 and 151 and connecting the grid of output amplifier 202 across the resistor 201 under the control of a switch 203. On playback, recording amplifier 155 would be disconnected, and the switch 203 opened to cause the voltage variations produced by the recorded fields to modulate voltage input to the tube 205 and thereby produce a signal at the output terminal 207. During playback, the backing electrode 52 is preferably set at a potential nearer to that of the beam than during recording. As the beam scans along the line of wires 40 on playback, it tends to set the potentials of these wires at a definite value. During the scanning process the recorded field of the tape associated with the scanned wire will in turn raise or lower the potential of the backing electrode 52, depending on the charge stored in the region of the tape being scanned. The amplifier 202 is preferably of a low input capacitance type.

As an alternative construction instead of wires 40 of the type illustrated in FIGURE 3, holes may be etched in the wall 22 of the tube by a photosensitive process, and the holes then plugged with indium solder or a similar conductive material.

In FIGURE 9 a recording head is illustrated which comprises a tube 230 having two series of recording electrodes 231 and 232 each similar to the series of electrodes 40 illustrated in FIG. 1. The recording beam 233 is adapted to be switched between an upper position as illustrated in FIG. 9 impinging on the series of electrodes 231 to a lower position impinging on the series of electrodes 232 by means of a switching arrangement diagrammatically illustrated as including plates 235 and 236 controlled by means of an electronic switching network 238 which is synchronized with the video signal by means of an input 240. The series of recording electrodes 231 and 232 are illustrated in relation to the tape 243 in FIG. 10. The series of electrodes 231 have an elongated backing electrode 245 extending across the width of the tape in the same manner as the backing electrode 52 in FIG. 1, and the series of electrodes 232 has a similar backing electrode 246. The head 230 may also carry an audio recording head comprising a backing electrode 248 and a knife-edge electrode 249 cooperating with a margin of the tape 243 as indicated at 248 in FIG. 10. As the tape 243 travels in the direction of the arrow 253 in FIG. 10, the first series of electrodes 231 is first energized to record a series of lines such as indicated by solid lines 260, after which the electronic switch 238 shifts the beam 233 to the lower series of electrodes 232 to record a series of lines such as indicated by dash lines 266. As illustrated, the spacing between the series of electrodes 231 and 232 is such in relation to the speed of the tape that one subframe of an interlaced video signal is recorded by the electrodes 231, after which the other subframe is recorded in interlaced relation therewith by the series of electrodes 232, so that the resultant pattern on the tape represents a complete frame of the video signal. Preferably, the recorded fields overlap in the manner previously discussed so that if particles were dusted on the tape, they would form an image corresponding to the image of the video signal recorded thereon. Since with the illustrated embodiment, the electrodes 231 will be inactive during the time when the electrodes 232 are recording on the tape, successive complete frames such as designated generally by the reference numeral 271 in FIG. 10 will be separated by unrecorded spaces such as indicated at 272 in FIG. 10. The audio signal would be recorded continuously by the head 248 as indicated by the sound track 275. The tape 243 may be provided with sprocket holes such as indicated at 276 for positively driving the tape and for synchronizing the recorded signal with the playback electrodes during reproduction of the recorded signal.

In FIG. 10, the unrecorded spaces can be used for another program or for the second half of the same program. As shown in FIG. 11, frames such as shown at 271 in FIG. 10 may alternate with frames 277 which may be recorded by a second head, for example, of the type shown in FIG. 9. Both series of frames may be recorded or played back on the same passage of the tape across the heads, or only one of the records may be selected for playback. A separate laterally offset head would produce the sound track 279 corresponding to the second series of frames.

FIG. 12 is similar to FIG. 11 except that the second series of frames 277′ and second sound track 279′ are recorded with the tape traveling in the opposite direction under the control of a second series of sprocket holes 276′. The same head such as that illustrated in FIG. 9 may be used for recording both series of frames and both sound tracks, and only the tape need be reversed in its direction of travel. Another possibility for more economical use of tape is a stepping mechanism that sets the film back a frame after every two frames of continuous motion.

During playback the tape of FIG. 10 would again travel over the head 230 illustrated in FIG. 9, and the solid recorded lines 260 would be first scanned by the electrodes 231 after which the interlaced dotted lines 266 would be scanned by the electrodes 232.

For present interlaced scanning systems, the electrodes 231 and 232 would be spaced a distance corresponding to one frame plus or minus one line on the record medium. Usually the spacing would be one frame less one line. Playback in FIG. 9 could be by any of the systems described herein. Scanning coils for the head 230 are illustrated at 280 and 281 which are energized to deflect the beam 233 in the plane at right angles to the plane of the paper in FIG. 9 in the same manner as with the embodiments of FIGS. 1 and 2.

It will be understood that the input at 240 to the switching circuit 238 is such as to shift the beam 233 between its upper and lower positions at the end of each successive surframe of the video signal to produce the complete frame 271 illustrated in FIG. 10. Bias and extraneous signals must be off between the scans of the successive alternate lines such as 260 by the electrodes 231 so as not to disturb the already recorded lines or spaces reserved for the interlaced lines. This can be done by choosing a system where no bias is present except at the instant of recording, as by turning off or deflecting the beam between lines, and by maintaining all the recording electrodes at the same potential between lines.

The spacing of one frame plus or minus one line is readily adjusted by changing the speed of the tape slightly. For perfect synchronism, a sprocketed drive can be used with perforations such as indicated at 276 on the tape, or equivalent electronic synchronizers can serve as well. The electronic switch 238 can be a standard circuit.

In FIG. 13 is illustrated a series of three heads 280, 281 and 282 having respective series of electrodes 284, 285 and 286 and backing electrodes 288, 289 and 290 pressing the tape 291 against each of the series of electrodes in the same manner as the backing electrode 52 in FIG. 1. The direction of travel of the tape 291 is illustrated by the arrow 293 in FIGS. 13 and 14, and the series of electrodes 284, 285 and 286 are diagrammatically illustrated in relation to the tape in FIG. 14. The arrangement of FIGS. 13 and 14 is useful where there are three interlaced subframes in the video signal, in which case the first subframe would be recorded by the head 280, the second by the head 281 and the third by the head 282 with suitable electronic switching means controlling the successive energization of the heads in accordance with the video signal.

In FIG. 14, the electrodes 284 record the solid lines such as indicated at 295, the electrodes 285 record the dash lines such as indicated at 296, and the electrodes 286 record the lines indicated by dot dash lines 297 in FIG. 14. For example, in a color system, electrodes 284 may record the red image, electrodes 285 may record the green image, and electrodes 286 may record the blue image. As previously, the electrodes 284, 285 and 286 would be spaced apart a distance corresponding to one frame minus one line recorded on the tape 291. The process illustrated in FIGS. 13 and 14 can be extended for interlaced color, etc.

FIG. 15 illustrates a suitable playback tube which may have the essential structure of any of the recording heads described hereinbefore. The playback head comprises a tube 310 having a series of electrically conductive wires 311 extending through an end face of the tube in the same manner as illustrated in FIG. 1 for the wires 40. The cathode 312 is connected to ground by means of a conductor 314, the control grid 316 connects with the power resistor 318 by means of a conductor 319 to provide a suitable negative bias, and the accelerating anode 321 is illustrated as connected to the resistor 318 by means of a conductor 323. The tape 325 may travel over the wires 311 as in the previous embodiments in the direction indicated by the arrow 326 and may be pressed against the ends of the wires 311 by means of a knife edge electrode 328 extending across the width of the tape in the same manner as the backing electrode 52 in FIG. 1. The electrode 328 may be maintained at a suitable positive or negative potential relative to the cathode 312 by means of batteries 330 and 331 connected in series aiding relation with respect to a resistor 335, to which the electrode 328 is connected by means of conductor 337 and a sliding contact. The batteries 330 and 331 are referenced to ground by means of the conductor 339. The cathode 312 may be suitably heated to emit a stream of electrons as indicated at 341 which are reflected by the electrodes 311 along a return path such as diagrammatically indicated at 342 to impinge upon a collector electrode indicated at 343. A conductor 345 leads from the collector electrode 343 to suitable amplifying means for reproducing the recorded signal. Suitable means are provided as in the preceding embodiments for causing the beam 341 to scan in the plane perpendicular to the plane of the paper along the series of electrodes 311.

In operation of the embodiment of FIG. 15, as the tape 325 travels past the electrodes 311, the charges on the tape will momentarily change the potential on the conductors 311 to correspond to a line of the recorded video signal. The beam is decelerated near the row of wires so as to be reflected just before it reaches the wires, and the returning beam strength varies with the potential on each wire 311 in the row as it is scanned. The reflected beam is picked up by electrodes 343 and delivered to an external amplifier by means of conductor 345. Alternatively, an electron beam multiplier may be built into the tube 310 in the conventional manner to amplify the returning beam 342.

In the modified playback tube illustrated in FIG. 16, the beam 360 within the tube 361 follows a curved path as indicated as the result of a steady magnetic field perpendicular to the plane of the paper in FIG. 16. A suitable deflecting magnetic field may also be provided for causing the beam 360 to scan the wires 362 in the plane perpendicular to the plane of the paper. The backing electrode 364 presses the traveling record medium 365 against the wires 362 as in the previous embodiments and the tape may travel in the direction indicated by the arrow 366.

The backing electrode 364 is maintained at a proper potential by means of a circuit identical to that shown in FIG. 15, and corresponding parts have been given the same reference numerals. As the beam passes the row of wires 362, it is more or less deflected due to the charges imparted to the wires 362 by the tape 365. The beam then impinges on the collector electrode 370, and a greater or lesser number of electrons strike the plate 370 depending upon the amount of deflection experienced by the beam during passage near the wires 362. The collector 371 serves to pick up the remaining electrons of the beam and may be connected to a suitable positive potential source. The electron current from the collector plate 370 is delivered to the grid of the amplifier tube 373 through coupling capacitor 374. If desired, the pair of collector plates may be used connected in push-pull so that an increase in electrons at one plate and a decrease in electrons on the other plate will provide a symmetrical output signal.

FIG. 17 illustrates another form of playback device including a tube 380 having an electron gun structure 382 for establishing a relatively narrow but vertically elongated beam of electrons 383 as in the embodiment of FIGS. 3 and 4. Suitable baffle plates such as indicated at 385 and 386 may limit the portion of the beam reaching the secondary emitter plate 388. The record tape 390 may travel in the direction indicated by the arrow 391 past a series of wires 392 which are arranged across the width of the tape as in the previous embodiments. The beam 383 is cyclically deflected in the direction perpendicular to the plane of the paper in synchronism with the line frequency of the video signal to successively scan the wires 392. Charges momentarily produced on the wires 392 serve to deflect the beam to a greater or lesser extent in the plane of the paper, so that a greater or lesser number of electrons are intercepted by the baffle plate 386. The number of electrons reaching the secondary emitter 388 is thus a function of the signal recorded on the record tape 390, and the secondary electrons reaching the collector plate 395 will likewise be a function of the recorded signal. Conductor 396 may be connected to a suitable amplifier circuit in the manner illustrated in FIG. 16, or a series of electron multipliers can replace the collector structure 395 for further amplification within the tube 380. The backing electrode 398 has the same general structure as the previous backing electrodes and may be connected to a circuit for controlling its potential as illustrated in FIGS. 15 and 16 by means of a conductor 399 corresponding to the conductors 337 shown in FIGS. 15 and 16.

The embodiment of FIG. 17 has the advantage that the secondary emitter 388 amplifies the beam signal for greater output and also eliminates the necessity for a bending field such as required in the embodiment of FIG. 16. The baffles 385 and 386 provide a beam path which is relatively insensitive to supply voltage variations and stray fields. Unwanted pickup can be reduced further by locating the baffles closer to each other and to the pickup element. The baffle electrodes can be connected to an automatic control system for keeping the beam regulated, if necessary.

Figures 18, 19, 20, 21, 22, 23, 24, 25, 26, 27, 28, 29, 30:
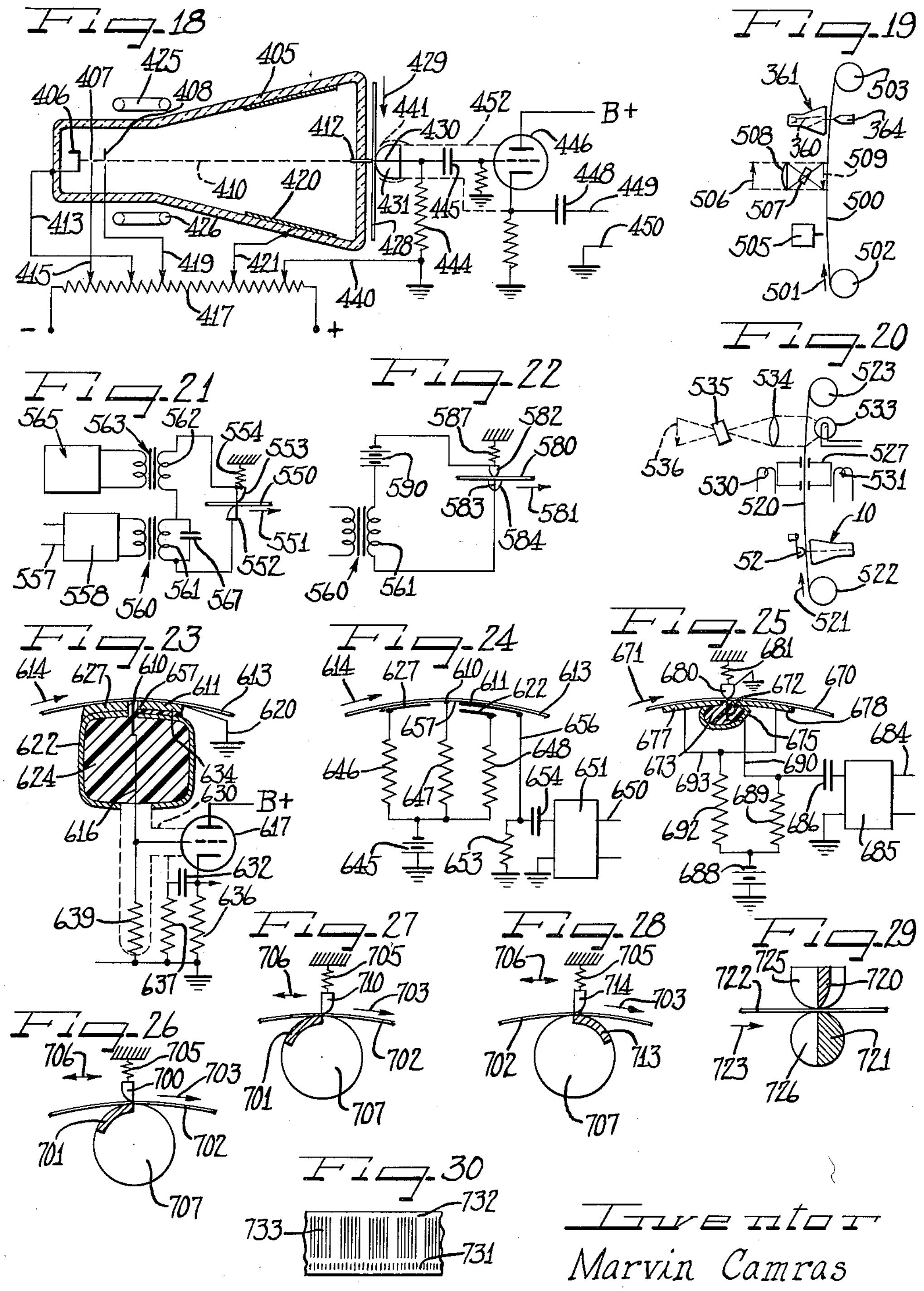
FIGURE 18 illustrates another modified playback system.
FIGURE 19 illustrates a system for forming an electrostatic surface charge image and electronically reproducing the image.
FIGURE 20 illustrates a system for forming an electrostatic internal charge image and reproducing the internal charge image optically.
FIGURE 21 illustrates a further recording system.
FIGURE 22 illustrates another recording system.
FIGURE 23 illustrates diagrammatically a playback system utilizing a longitudinal gap.
FIGURE 24 illustrates a recording system corresponding in head structure to FIGURE 23.
FIGURE 25 illustrates a perpendicular recording system.
FIGURES 26 through 29 illustrate various head structures in accordance with the present invention.
FIGURE 30 illustrates a modified record medium utilizing a magnetically recorded audio track and an electrostatically recorded video track.

FIG. 18 illustrates a further playback tube 405 having a cathode 406, a control grid 407, and an anode 408 for directing an electron beam 410 toward a series of electrically conductive wires 412 arranged in the same manner as the wires 40 of FIG. 1. Conductor 413 connects the cathode to the power supply resistor 417, while control grid 407 is also connected to resistor 417 by means of a conductor 415. Anode 408 is connected by means of a conductor 419 with the power supply resistor 417, and a conductive coating in the inner wall of the tube indicated at 420 is connected by means of a conductor 421 to a point of higher positive potential on the resistor 417. Magnetic deflection coils 425 and 426 serve to deflect the beam in the direction normal to the plane of the paper in synchronization with the line frequency of a video signal, for example. The tape 428 travels in the direction of the arrow 429 and is pressed against the ends of the wires 412 by means of a backing electrode 430 which may comprise a thin lamination of electrically conductive material extending across the width of the tape and embedded in an insulating case 431 of epoxy resin or the like. Alternatively the backing electrode may take the form of a resilient pad such as 52 in FIG. 1 having a conductive material impregnated therein. In either case, the backing electrode may be pressed against the tape as in the embodiments of FIGS. 1 and 2.

The backing electrode 430 is biased with respect to the beam voltage by the variable contact of conductor 440 with power supply resistor 417. This voltage can be positive, negative or zero. A guard shield driven to the same potential as the grid indicated diagrammatically at 441 is provided around the sensitive electrode 430 to neutralize its capacitance. The output voltage is developed across resistor 444 and is delivered through coupling capacitor 445 to the grid of the amplifier tube 446. The output of the amplifier is delivered through capacitor 448 and output conductors 449 and 450 to a suitable apparatus such as a television playback device. The conductive connection between the backing electrode 430 and the grid of the tube 446 may be suitably shielded as indicated at 452, and the shielding 452 may be connected to the cathode of the tube as indicated, the shielding 452 being connected with the shielding 441 to maintain the shielding at cathode potential.

In each of the foregoing embodiments, the grid of electrodes extending through the tube wall may be made by photoetching and evaporating techniques, and depositing a suitable material in the holes formed in the tube wall by these techniques. A material such as indium or indium solder is suitable for depositing to provide the conductive paths through the wall of the tube. In general any of the electrode structures, record materials, voltages and the like described for any of the embodiments will be applicable to the other embodiments by one skilled in the art from the foregoing description. In each case, the recording or reproduction may be carried out at room temperature without any stressing of the record materials such as might give rise to piezo-electric effects or the like. The internal fields of the record medium in each of the illustrated embodiments may overlap longitudinally and laterally as described herein, and are adapted to be repeatedly played back by the heads herein described. The various expedients for reducing noise described herein may be applied to each of the illustrated embodiments, and in each case it is desirable to support the moving tape firmly near the head to prevent mechanical vibration. During recording, suitable D.C. or A.C. bias may be provided for producing the desired internal charge record as herein described.

In FIG. 19 is illustrated a photoconductive record tape 500 moving in the direction of the arrow 501 from a supply reel 502 to a takeup reel 503. Suitable apparatus indicated at 505 is provided for charging the surface of the tape 500, after which an image such as indicated at 506 is suitably projected onto the moving tape 500 through an optical recitifier 507 and a lens 508 to render the tape 500 conductive over the area of the impinging light image 509. The charge image thus formed is reproduced by means of a playback head such as indicated at 361 and described in greater detail in connection with FIG. 16. Instead of using an optical rectifier, the tape 500 may be moved intermittently in any suitable manner at 509 in FIG. 19. It will be understood that any of the other playback heads disclosed herein may be utilized for electrically reproducing the recorded charge image. For sound pictures a side track is recorded on a portion of the film stabilized in the usual manner for movement at constant speed.

The mechanism of recording in this example is distinctly different from that of the preceding embodiments inasmuch as the charge imparted to the tape 500 is a surface charge, and consequently, the tape in general cannot be repeatedly played back as in the preceding embodiments.

FIG. 20 illustrates a process wherein a record medium 520 similar to that used in the embodiments of FIGS. 1 to 18 is moved in the direction of the arrow 521 from a supply reel 522 to a takeup reel 523 and receives an internal charge pattern thereon in accordance with a video signal by means of a recording head 10 of the type illustrated in FIGS. 1 and 2. The tube 10 may have the characteristics of any one of the embodiments described herein and preferably records a laterally and longitudinally overlapping charge pattern as described herein. The charged tape may travel through a dusting chamber 527 which may suitable contain permanent magnet particles which are continuously agitated by means of an alternating signal supplied to coils 530 and 531 for depositing a uniform coating of particles on the tape in accordance with the internal charge pattern on the tape. Alternatively, other suitable dusting means can be used, and if permanence is desired the image is subsequently fixed by overcoating, or by melting a thermoplastic base wax. The particle distribution on the tape, which in the illustrated embodiment would be suitably translucent, is projected by means of a light source 533, lens 534 and optical rectifier 535 to form a light image as indicated at 536 which will correspond to the video signal applied to the recording tube 10.

In FIG. 21 there is illustrated a record tape 550, which may, for example, be any of the tape materials previously mentioned and which travels in the direction of the arrow 551 between a pair of electrodes 552 and 553 with the electrode 553 pressing the tape against the stationary electrode 552 by means of a coil compression spring 554. The electrode 553 is suitably guided to maintain its sharp leading edge in vertical alignment with the sharp trailing edge face of the electrode 552. The signal to be recorded may be introduced at 557 to the amplifier and equalizer 558. The amplifier 558 drives an output transformer 560 whose secondary 561 is connected in series with the secondary 562 of a transformer 563 driven by a high frequency bias oscillator 565. Capacitor 567 bypasses the high frequency around the transformer secondary 561. By way of example, the high frequency source 565 may operate at 20 kilocycles per second and impress an A.C. bias voltage of approximately 500 to 1000 volts R.M.S. for .00025 inch "Mylar." The signal voltage is superimposed on this A.C. bias voltage and is recorded on the tape 550 as an internal charge pattern.

FIG. 22 illustrates a recording circuit for recording on a tape 580 which may, for example, be one of the materials previously mentioned. The tape may travel in the direction of the arrow 581 between a spring biased backing electrode 582 and a knife edge electrode or lamination 583 embedded in a suitable insulating case 584 which may be of one of the materials previously mentioned. The backing electrode 582 may be of a resilient material such as felt impregnated with a conductive material such as graphite, or may be made of resilient metallic fibers as previously described. The backing electrode 582 is urged by means of a coil compression spring 587 toward the lamination electrode 583 as in the embodiment of FIG. 21. The audio voltage or other signal voltage to be recorded is introduced by means of a transformer 560 as in FIG. 21 and this is superimposed on a D.C. bias voltage from a suitable source such as battery 590. By way of example, the D.C. bias voltage may be approximately 900 to 1000 volts for .00025 inch "Mylar."

In FIG. 23 is illustrated a longitudinal playback head for longitudinally recorded internal charge patterns. The head includes a sharp edge pickup electrode 610 and an electrode 611 forming therebetween a longitudinal gap across which the record medium 613 may travel in the direction of the arrow 614. The record medium 613 may be, for example, any of the materials previously mentioned and may have an internal charge pattern thereon consisting of successive incremental regions varying in charge in accordance with a signal to be recorded. The charge pattern on the tape will produce a varying voltage across the longitudinal gap between the electrodes 610 and 611 which is delivered by means of the conductor 616 to the grid of an amplifier tube 617. The electrode 611 is connected to ground by means of a suitable conductor 620. The electrodes may be carried by means of a suitable case 622 of conductive material surrounding an insulating material 624 which embeds the knife edge electrode 610 and fills the gap between the electrode 610 and the electrode 611 and the gap between the electrode 610 and the metallic tape guide member 627 which is conductively connected to the shield case 622. Suitable shielding for the conductor 616 is indicated at 630 and is connected with the shield case 622 at one end and with the cathode of the tube 617 through a coupling capacitor 632 at the other end. Thus the amplifier drives the shield substantially to the grid potential to minimize the potential difference across the gap between the member 627 and the knife edge electrode 610. The electrode 611 is suitably insulated from the case as indicated at 634. By way of example, the plate voltage for the tube 617 may be 250 volts and the tube may be type 6C4. Cathode resistor 636 may have a resistance of 50,000 ohms while the coupling capacitor 632 may have a capacitance of 2.5 microfarads and the resistor 637 may have a resistance of one megohm. The input resistor 639 may have a resistance of 120 megohms.

A circuit such as illustrated in FIG. 23 provides an extremely high impedance input circuit, since the shielding 622–630 follows the A.C. potential of the grid of tube 617 and the input capacitance is largely neutralized. Ideally, as the gain approaches unity, the input capacity approaches zero. Actual gain of this simple circuit is measured at 0.85. A more complicated circuit can be adjusted to zero, or even negative input capacitances. The effective input resistance also is increased greatly by use of such a circuit.

FIG. 24 illustrates the head of FIG. 23 operated as a recording head and corresponding parts have been given the same reference numeral. In this case, parts 627, 610 and 622 are connected to a suitable bias source 645 through resistors 646, 647 and 648, respectively. The signal to be recorded is introduced at 650 at the input of a suitable amplifier 651, and the output signal is delivered to a resistor 653 through a suitable coupling capacitor 654, the signal being applied to the electrode 611 by means of the conductor 656 to record a longitudinal internal charge signal on the record 613 as it travels across the gap indicated at 657, which may be filled with a suitable dielectric material as in FIG. 23. As in the previous embodiments, the bias source 645 will have a sufficient bias to insure recording of an internal charge on the record medium 613, and the record medium may be of any of the materials previously described, for example.

FIG. 25 illustrates a head for perpendicular recording on a record tape 670 traveling in the direction indicated by the arrow 671. The lower electrode 672 may comprise a thin knife edge of about $\frac{3}{16}$ inch width and embedded in a polystyrene case such as indicated at 673 whose top surface is flush with the top edge of the electrode 672. The polystyrene insulation 673 may be enclosed in a brass case 675 which is conductively connected to the tape guide plates 677 and 678. A suitable backing electrode 680 may be spring urged by means of coil compression spring 681 against the upper surface of the tape to press the tape against the knife edge electrode 672, and the electrode 680 may be of resilient material such as felt impregnated with graphite or may be a pad of resilient metal fiber, for example. The electrode 680 may be grounded as indicated and the signal to be recorded may be supplied from conductor 684 through amplifier 685 and capacitor 686 to the knife edge electrode 672, while a suitable bias source 688 is connected through resistor 689 and conductor 690 to the knife edge electrode 672 and is connected through resistor 692 and conductor 693 to the tape guide plates 677 and 678 and the metal case 675. Alternatively, the electrode 680 may be a carbon brush.

During playback, the case 675 may be driven by means of the cathode of an output amplifier so as to follow the grid voltage as illustrated in FIG. 23, so that there will be no substantial potential difference across the gaps between the members 677 and 678 and the sensing electrode 672 on playback. Perpendicular recording and playback of internal fields by the apparatus illustrated in FIG. 25 has been found to give superior results for voice signals as compared with the longitudinal system of FIGS. 23 and 24. The D.C. bias voltage supplied in FIG. 25 from the source 688 may advantageously be approximately 900 to 1000 volts for a tape of .00025 inch "Mylar." If A.C. bias voltage is used, voltages of approximately 500 to 1000 volts R.M.S. for .00025 inch "Mylar" are advantageous.

FIGS. 26, 27, 28 and 29 illustrate head configurations which may be utilized with any of the preceding circuits. In FIG. 26, the backing electrode 700 cooperates with a metallic curved plate electrode 701, and a record medium 702 such as previously described moves between the electrodes in the direction of the arrow 703. Electrodes 700 and 701 each have a sharp trailing edge. The backing electrode 700 is spring urged against the tape by means of a resilient compression spring 705, and the assembly 705—700 may be adjustable longitudinally of the record path as indicated by the arrows 706. The electrodes 701 may be carried on a member 707 of dielectric material.

FIG. 27 illustrates a similar head and corresponding parts have been given the same reference numeral. However, in this case the backing electrode 710 has a sharp leading edge vertically aligned with the sharp trailing edge of the electrode 701.

FIG. 28 illustrates a further head assembly in which the same reference numerals designate corresponding parts. In this case electrodes 713 and 714 both have sharp leading edges. The head of FIG. 28 is found to give somewhat better results than the heads of FIGS. 26 and 27, possibly because corona effects were quenched more rapidly as last seen by the tape 702 if the tape traveled into the sharp edge sides of the electrodes as shown in FIG. 28. It is desirable to minimize or eliminate corona caused by breakdown of the air near the sharp electrode edges for high resolving power of the electrodes. Also where corona is present during recording, the record will produce a hissing noise on playback. Further, corona if present during recording generates ozone which may be annoying. Embedding the pole pieces in a high dielectric strength material, for example as illustrated in FIG. 29, seems to be a solution.

In FIG. 29, electrodes 720 and 721 may be resiliently pressed against the tape 722 which may travel in the direction of the arrow 723. In this case, the electrodes 720 and 721 each have sharp leading edges and are embedded in a high dielectric strength material as indicated at 725 and 726 to reduce corona.

It will be apparent to those skilled in the art that the various circuits, electrode structures, head configurations and the like may be interchanged between the various illustrated embodiments, and it should be understood that all such modifications are considered as specifically included herein. In each case except in FIG. 19, the present invention contemplates internal charges on a dielectric record medium rather than surface charges which are temporary and easily wiped off. Record thicknesses of from .00025 to .001 inch are suitable in each embodiment, and the record materials mentioned herein are suitable examples. Recording may be carried out in each of the embodiments with a D.C. biasing potential that sets up a field of the order of the breakdown potential of the tape when the A.C. signal to be recorded is superimposed thereon. Similarly, recording may be carried out with a high frequency bias which when superimposed on the A.C. signal to be recorded sets up a field of the order of the breakdown potential of the tape as a maximum value. Recording and playback may be of a longitudinal type signal field, a perpendicular signal field, or signal field of other orientation or combination of orientations. In each embodiment, the heads may be embedded with a high dielectric strength material to limit or prevent corona formation at the edges. The electrodes are preferably in intimate contact with the record medium, and are preferably resiliently pressed against the record. In each case, the record may be erased by a high frequency field, or a saturating D.C. field.

In each of the illustrated embodiments recording and playback are preferably carried out at room temperature with no stressing of the tape such as would give rise to piezoelectric effects. Preferably also in each of the embodiments, the tape is confined and guided at its lateral edges and firmly supported as it travels across the head to prevent vibration and the like. While a film or web type record medium is desirable, it will be apparent that many other types and forms of record media can be utilized with the embodiments of the present invention, for example disc, or belt records. While video and audio signals have been mentioned, it will be appreciated that signals of any type may be recorded and played back in accordance with the present invention. Further, it will be apparent that the present invention is applicable to other modes of recording wherein fields are recorded internally of the record medium and are capable of repeated playback by electrical scanning.

In FIGURES 5 and 6, the wires 103 are advantageous with a beam of small circular cross section as well as with a vertically elongated beam as shown.

On playback, the surface charges or other non-permanent charges may be neutralized by any of the means heretofore described to eliminate undesired noise, such means being indicated at 730 in FIGURE 16.

In FIGURE 29, 721 and 726 may be a single homogeneous conductive electrode of cylindrical configuration.

With video systems, as illustrated in FIGURE 30 the sound track may comprise a conventional magnetic record material in the form of a stripe 731 on a dielectric film 732, in which case a conventional magnetic recording and playback head structure would be substituted for electrostatic heads such as 80—81 in FIGURE 1. The video electrostatic trace is indicated at 733. Such a record has the advantage of no mutual interference between sound and video.

In FIGURES 13 and 14, for a color video signal, heads 280, 281 and 282 are energized simultaneously, and thus each frame position such as 298, 299 and 300 will receive a composite image containing information regarding all three primary colors.

In FIGURE 25, for playback, the thin edge electrode 672 would be connected to the grid of the amplifier tube in FIGURE 23, while conductor 693 of FIGURE 25 would be connected to the shield circuit 630 in FIGURE 23. Backing electrode 680 would be connected to ground. Excellent results have also been obtained by connecting electrode 672 to the grid of a conventional amplifier of relatively low input resistance and high input capacitance, the backing electrode again being grounded.

It is believed that the charges recorded by the present invention are retained internally of the record medium by electron trapping effects, but regardless of the exact mechanism, it has been found that the recorded charges behave in a distinctly different manner from surface charges and other like phenomena.

While numerous examples have been given of embodiments of the present invention, it will be understood that these are merely by way of example, and are not intended in a limiting sense, since many other and further modifications will readily occur to those skilled in the art which are properly within the scope of the novel concepts of the present invention.

I claim as my invention:

1. Means for converting a video image signal having a succession of sub-frames into a composite image frame, comprising a plurality of recording means spaced along a travelling record medium a distance to interlace the sub-frames when the recording means are energized in succession, and means for supplying successive subframes of the video signal to successive recording means cyclically and in sequence to record composite frames on the record medium.

2. Means for converting composite recorded image frames on a record medium into subframes comprising a plurality of playback means spaced along the path of travel of the record medium a distance to scan different lines of each composite frame when the playback means are successively energized, and means for receiving playback signals from successive playback means cyclically and in predetermined sequence.

3. A system for recording information on a moving dielectric recording medium, comprising an evacuated tube, electron gun means within said tube for projecting an electron beam, a series of conductors extending through a wall of said tube, said conductors being positioned so that the interior ends thereof are in position to be impinged by said beam and the exterior ends thereof are engaged by one surface of said recording medium along a line extending transverse of the movement of the recording medium, means causing said beam of electrons to cyclically scan the interior ends of said conductors, backing electrode means of conductive resilient material engaging said medium along a line extending transverse of said medium and opposite the exterior ends of said conductors, and means connected to said electron gun means and to said backing electrode means for applying across the same a voltage representing the information to be recorded, said voltage being greater than a voltage required to create internal charges within said moving recording medium corresponding to said information, but less than the breakdown potential of the medium, thereby providing a charge pattern within said medium which can be repeatedly played back over an extended period of time.

4. A reproduction system for use with a moving dielectric record medium having an internal charge pattern representing the signal recorded thereon, comprising an evacuated tube, a series of conductors extending through a wall of said tube, the exterior ends of said conductors being in inductive relationship with the charge pattern on said medium whereby charges are induced in said conductors, electron gun means within said tube for projecting a beam of electrons into the electric field established at the interior ends of said conductors by the charges induced in said conductors, the beam being thereby deflected in accordance with said charges, means causing said beam to cyclically scan the interior ends of said series of conductors, and means for electrically sensing the deflection of said beam to produce an electrical signal varying in accordance with the internal charge pattern.

5. A reproduction system for use with a moving dielectric record medium having an internal charge pattern representing the signal recorded thereon, comprising an evacuated tube, a series of conductors extending through a wall of said tube, the exterior ends of said conductors being engaged by one surface of said medium whereby charges are induced in said conductors by the charge pattern, backing electrode means engaging the other surface of said medium and pressing the same against said conductors, electron gun means within said tube for projecting a beam of electrons into the electric field established at said conductors by the charges induced therein, the beam being thereby deflected in accordance with said charges, means connected across said backing electrode means and said electron gun means for applying across the same a D.-C. voltage, means causing said beam to cyclically scan the interior ends of said series of conductors, and means for electrically sensing the deflection of said beam to produce an electrical signal varying in accordance with the internal charge pattern.

6. A playback system for use with a moving dielectric record medium having an internal charge pattern representing the signal recorded thereon, comprising an evacuated tube having a series of conductors extending through a wall thereof, the external ends of said conductors being in inductive relationship with the charge pattern in said medium whereby charges are induced in said conductors, electron gun means within said tube for projecting a beam of electrons through the electric field established at the interior ends of said conductors by the charges induced therein, the beam being thereby deflected in accordance with said charges, means causing said beam to cyclically scan the interior ends of said conductors, baffle means within said tube for intercepting a portion of said beam of electrons depending upon the amount of deflection thereof, and means within said tube beyond said baffle means for generating an electrical signal in accordance with the beam of electrons flowing past the baffle means.

7. A transducer system comprising a pair of spaced, opposed electrodes, means for moving a dielectric record medium between, and in contact with said electrodes, means connected to said electrodes for applying a voltage across the same which represents a signal being recorded, said voltage being greater than a value where substantial charges are transferred to the interior of the record medium but less than the breakdown voltage of the medium, one of said electrodes being of conductive material and being shaped and spatially positioned so that said medium is spaced from said one electrode adjacent a position where said one electrode contacts said medium, and a dielectric material on the surface of said one electrode adjacent the position of contact to limit corona formation at said electrode during recording on the medium, said one electrode being exposed directly to said record medium at said position of contact, thereby providing a charge pattern within said medium which can be repeatedly played back over an extended period of time, the other of said electrodes being composed of resilient, relatively non-conductive material impregnated with conductive material.

8. A transducer system comprising a pair of spaced, opposed electrodes, means for moving a dielectric record medium between, and relative to said electrodes, means connected to said electrodes for applying a voltage across the same which represents a signal being recorded, said voltage being greater than a value where substantial charges are transfered to the interior of the record medium but less than the breakdown voltage of the medium, one of said electrodes being of conductive material and having a knife edge directed toward said medium, and a dielectric material adjacent said knife edge on the surface of said one electrode faced toward the unrecorded portion of the record medium, to limit corona formation at said electrode during recording on the medium, said knife edge being directly exposed to said dielectric record medium, thereby providing a charge pattern within said medium which can be repeatedly played back over an extended period of time.

9. A transducer system comprising a pair of spaced, opposed electrodes, means for moving a dielectric record medium between, and relative to said electrodes, means connected to said electrodes for applying a voltage across the same which represents a signal being recorded, said voltage being greater than a value where substantial charges are transferred to the interior of the record medium but less than the breakdown voltage of the medium, one of said electrodes being of conductive material and having a knife edge directed toward said medium, and a dielectric material adjacent said knife edge on both the leading and trailing surfaces of said one electrode to limit corona formation at said electrode during recording on the medium, said knife edge being directly exposed to said dielectric record medium, thereby providing a charge pattern within said medium which can be repeatedly played back over an extended period of time.

10. A transducer system comprising a pair of spaced, opposed electrodes, means for moving a dielectric record medium between, and relative to said electrodes, means connected to said electrodes for applying a voltage across the same which represents a signal being recorded, said voltage being greater than a value where substantial charges are transferred to the interior of the record medium but less than the breakdown voltage of the medium, one of said electrodes being of conductive material and having a surface which extends generally normal to the path of the record medium and terminates at one end adjacent the record medium, and a dielectric material on said surface adjacent the record medium to limit corona formation at said electrode during recording on the medium, said electrode being directly exposed to said record medium adjacent said medium, thereby providing a charge pattern within said medium which can be repeatedly played back over an extended period of time.

11. A transducer system comprising a pair of spaced, opposed electrodes of conductive material, means for moving a dielectric record medium between, and relative to said electrodes, one of said electrodes having a knife edge directed toward said medium, a dielectric case, said one electrode being embedded in said dielectric case with the knife edge at the surface thereof, and an electrical shield means of conductive material disposed about said dielectric case, a portion of said shield means extending between said recording medium and said dielectric case to a position adjacent said knife edge.

12. A transducer system comprising a pair of spaced, opposed electrodes, means for moving a dielectric record medium between, and in contact with said electrodes, one of said electrodes being of conductive material and having a knife edge directed toward said medium, and a case of dielectric material, said electrode being embedded in said dielectric case with the knife edge at the surface thereof, the other of said electrodes being composed of resilient, relatively non-conductive material impregnated with conductive material.

13. A recording system for recording information on a dielectric recording medium comprising a pair of spaced opposed electrodes, means for moving said medium relative to, and between said electrodes, means electrically connected to said electrodes for applying a voltage thereacross which represents the information being recorded, and means electrically connected to said electrodes for applying a bias voltage thereacross which periodically varies with time, the total voltage applied across said electrodes periodically exceeding that required for transfer of substantial internal charges to said dielectric recording medium but being less than the breakdown potential of said medium thereby producing an internal charge pattern in the record medium which can be repeatedly played back over an extended period of time.

14. A system for recording information on a dielectric recording medium, comprising a pair of spaced, opposed electrodes, means for moving said medium between, and in contact with said electrodes, means electrically connected to said electrodes for applying a recording voltage thereacross which represents the information being recorded, and means electrically connected with said electrodes for applying a high frequency bias voltage thereacross, the sum of said bias voltage and said recording voltage exceeding that required for transfer of substantial internal charges to said dielectric record medium but being less than the breakdown potential of said medium, thereby producing an internal charge pattern in the record medium which can be repeatedly played back over an extended period of time.

15. Means for converting a video image signal having first and second sub-frame signals into a composite image frame, comprising means for supplying a voltage representing the first and second sub-frame signals, a first and a second recording means spaced sequentially along a moving dielectric record medium, each of said recording means including a series of spaced apart wire electrodes positioned so that the ends thereof engage the recording medium along a line extending generally transversely of the movement of the recording medium, backing electrode means engaging the recording medium along a line extending generally transversely of the recording medium and opposite the ends of said wire electrodes, and means coupling said voltage supply means to said backing electrode means and successively to said wire electrodes in synchronism with the sub-frame signal voltage applied thereto, said voltage being greater than a voltage which when connected between one of said wire electrodes and said backing electrode means creates internal charges within said moving recording medium corresponding to said voltage, but less than the breakdown potential of the medium, and means for coupling said voltage supplying means to said first recording means during said first sub-frame signal and to said second recording means during said second sub-frame signal, the spacing between said first and said second recording means along the medium being such as to interlace the recorded sub-frames.

16. Means for converting a composite image frame electrostatically recorded on a dielectric record medium into first and second sub-frame signals, comprising a first and a second playback means spaced sequentially along the path of travel of the record medium, each of said playback means including a series of spaced apart, wire electrodes positioned so that the ends thereof are disposed on one side of said medium along a line extending generally transversely of the movement of the record medium, backing electrode means disposed on the opposite side of said medium substantially opposite said wire electrodes, and means for successively energizing said wire electrodes so as to scan said recorded image frame, the playback means being spaced along the path of travel of the record medium a distance such that the first playback means first scans selected lines of the recorded image frame and then the second playback means scans different lines of the recorded image frame, means for receiving playback signals from said playback means, and means for coupling said receiving means to said first playback means when the recorded image frame is being scanned by said first playback means and to said second playback means when the recorded image frame is being scanned by said second playback means.

17. A system for recording information on a dielectric recording medium, comprising a pair of spaced opposed electrodes, means for moving said medium between, and in contact with said electrodes, at least one of said electrodes being composed of resilient, relatively non-conductive material impregnated with conductive material, means electrically connected to said electrodes for applying a recording voltage thereacross which represents the information being recorded, and means electrically connected with said electrodes for applying a high frequency bias voltage thereacross, the sum of said bias voltage and said recording voltage exceeding that required for transfer of substantial internal charges to said dielectric record medium but being less than the breakdown potential of said medium, thereby producing an internal charge pattern in the record medium which can be repeatedly played back over an extended period of time.

(References on following page)

References Cited in the file of this patent

UNITED STATES PATENTS

| | | |
|---|---|---|
| 2,059,473 | Metcalf | Nov. 3, 1936 |
| 2,200,741 | Gray | May 14, 1940 |
| 2,273,793 | Ekstrand | Feb. 17, 1942 |
| 2,291,476 | Kernkamp | July 28, 1942 |
| 2,297,398 | Fries | Sept. 29, 1942 |
| 2,380,467 | Ressler | July 31, 1945 |
| 2,657,377 | Gray | Oct. 27, 1953 |
| 2,730,558 | Skellett | Oct. 11, 1955 |
| 2,771,336 | MacGriff | Nov. 20, 1956 |
| 2,777,745 | McNaney | Jan. 15, 1957 |
| 2,829,025 | Clemens et al. | Apr. 1, 1958 |

OTHER REFERENCES

Electronics, pages 148–149, April 1956.